(12) United States Patent
Ding et al.

(10) Patent No.: US 7,461,549 B1
(45) Date of Patent: Dec. 9, 2008

(54) MASS FLOW VERIFIERS CAPABLE OF PROVIDING DIFFERENT VOLUMES, AND RELATED METHODS

(75) Inventors: Junhua Ding, Tewksbury, MA (US); Kaveh H. Zarkar, Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 11/769,435

(22) Filed: Jun. 27, 2007

(51) Int. Cl.
*G01F 3/14* (2006.01)
(52) U.S. Cl. ..................................... 73/239
(58) Field of Classification Search ................ 73/239, 73/199, 865; 702/100
See application file for complete search history.

(56) References Cited

U.S. PATENT DOCUMENTS

| | | | | |
|---|---|---|---|---|
| 4,802,362 | A * | 2/1989 | Haynes | 73/249 |
| 5,193,389 | A * | 3/1993 | Fleming, Jr. | 73/239 |
| 5,684,245 | A | 11/1997 | Hinkle | |
| 6,955,072 | B2 | 10/2005 | Zarkar | |
| 7,100,800 | B2 * | 9/2006 | Yakasovic Saavedra et al. | 222/3 |
| 7,174,263 | B2 * | 2/2007 | Shajii et al. | 702/100 |
| 2004/0261492 | A1 | 12/2004 | Zarkar et al. | |
| 2006/0005882 | A1 | 1/2006 | Tison et al. | |
| 2006/0123921 | A1 | 6/2006 | Tison et al. | |

FOREIGN PATENT DOCUMENTS

EP 0 890 828 A1 1/1999

OTHER PUBLICATIONS

PCT International Search Report for related PCT Application No. PCT/US2006/07711, (2 pages).
PCT Written Opinion of the International Searching Authority for related PCT Application No. PCT/US2006/07711, (5 pages).
PCT International Search Report for Related PCT/US2007/072186, dated Jan. 30, 2008 (4 pages).
Written Opinion for related PCT/US2007/072186, dated Jan. 30, 2008 (8 pages).
MKS Instruments, Inc., Gas Box Rate-Of-Rise In Situ Flow Verifier the GBROR, Bulletin GBROR-8/99, 6 pp.
MKS Instruments, Inc., Tru-Flow Mass Flow Verifier, Model GBR3A, Bulletin Tru-Flow-5/01, 4 pp.

* cited by examiner

*Primary Examiner*—Jewel V Thompson
(74) *Attorney, Agent, or Firm*—McDermott Will & Emery

(57) ABSTRACT

Embodiments of the present disclosure are directed to systems, methods, and apparatus, including software implementation, useful for high-precision measurement of mass flow rate over a large range of flows by using multiple volumes, each having a different and selected size. Use of a single manometer can facilitate reduced cost, and the use of multiple chamber volumes that are sized according to sub-flow ranges within the overall range of the mass flow verifier, or a related device under test, can provide high accuracy while reducing deleterious effects of noise in the flow measurement.

18 Claims, 5 Drawing Sheets

200

(PRIOR ART)

(PRIOR ART)

(PRIOR ART)

FIG. 4    400

MASS FLOW VERIFIERS CAPABLE OF PROVIDING DIFFERENT VOLUMES, AND RELATED METHODS

RELATED APPLICATIONS

This application is related to U.S. Ser. No. 11/479,092 filed 30 Jun. 2006, which in turn is a continuation-in-part of U.S. Ser. No. 11/090,120 filed 25 Mar. 2005, the contents of both applications being incorporated herein in their entireties by reference.

BACKGROUND

High-precision fluid delivery systems have become very important in many industrial applications, for example in the semiconductor industry for wafer and chip fabrication. Such fluid delivery systems typically include components such as mass flow controllers (MFCs) and mass flow verifiers (MFVs) to regulate or monitor fluid flow.

The fabrication of a single semiconductor device can require the careful synchronization and precisely measured delivery of as many as a dozen or more gases to a processing tool usually including a process chamber. Various recipes are used in the fabrication process, and many discrete processing steps where a semiconductor device is cleaned, polished, oxidized, masked, etched, doped, metalized, etc., for example, may be required. The steps used, their particular sequence, and the materials involved, all contribute to the making of a semiconductor device.

Wafer fabrication facilities are commonly organized to include areas in which gas manufacturing processes, such as chemical vapor deposition, plasma deposition, plasma etching, and sputtering, are carried out. The processing tools, be they chemical vapor deposition reactors, vacuum sputtering machines, plasma etchers or plasma enhanced chemical vapor deposition or other types of systems, machines or apparatus, are supplied with various process gases. The process gases are supplied to the tools in precisely metered quantities.

In a typical wafer fabrication facility the gases are stored in tanks, which are connected via piping or conduit to a gas box. Such gas boxes can be used to deliver precisely metered quantities of pure inert or reactant gases from the tanks of the fabrication facility to a processing tool. The gas box, or gas metering system, typically includes a plurality of gas paths having gas units. Such units typically include gas sticks which in turn can include one or more components, such as valves, pressure regulators, pressure transducers, mass flow controllers (MFCs) and mass flow meters (MFMs), as well as other units, such as mass flow verifiers (MFVs).

Prior art mass flow verifiers (MFVs) have been used to provide in situ verification of mass flow controller performance for fluid delivery systems and/or related semiconductor process tools. FIG. 1 depicts an example of one such prior art mass flow verifier (MFV) 100 as used to verify flow from a device under test (DUT), such as a mass flow controller MFC 104. MFV 100 can include a vessel or chamber 102 having a predetermined volume, an upstream or first valve 108 controlling flow between a gas manifold (not shown) and the chamber 102, a downstream or second valve 110 controlling flow from the chamber 102 to an outlet, e.g., a vacuum pump, a pressure sensor 112, typically a capacitive manometer, configured to sense the pressure within chamber 102, and a temperature sensor 114.

As shown in FIG. 1, a typical MFV 110 can include a controller 120 that receives the output signals of the pressure sensor 112 and temperature sensor 114 and controls the operation of the upstream valve 108 and the downstream valve 110.

With continued reference to FIG. 1, in operation, controller 120 is generally programmed so that during operation the controller 120 first opens the upstream and downstream valves 108 and 110 so that flow occurs through the upstream valve 108, into the vessel 102 and out the downstream valve 110. The controller 120 is further programmed so that after an initialization period sufficient to allow the flow to stabilize, the downstream valve 110 is closed to stop flow from the chamber 102. As the chamber 102 is filled with fluid from the MFC 104, the controller 120 receives measurement signals of vessel pressure from manometer 112, receives measurements of time from its clock, and determines a rate of change in vessel pressure due to the gas flow. The controller 120 then determines from these measurements the actual flow rate provided by the MFC 104 so that the accuracy of the MFC can be determined.

After the flow measurement is made, typically the upstream valve 108 is then closed and the downstream valve 110 is opened to purge the vessel 102, e.g., by way of connection to a vacuum pump (not shown). Thus, by utilizing sample values of pressure measurements, the controller 120 can calculate the gas flow rate from the measured change in pressure over time ($\Delta P/\Delta t$) in the known volume of the vessel 102. An example of the operation is graphically shown in FIG. 2 represented by the mathematical models expressed in accordance with EQ. (1) described below.

FIG. 2 is a graph depicting the pressure (P) vs. time (t) relationship 200 of pressure within a typical manometer utilizing the rate-of-rise ("ROR") measurement technique. For typical mass flow verification, a controller, e.g., controller 120 of FIG. 1, or other device/component having similar computational functionality, utilizes the rate-of-rise method of flow verification generally in accordance with the following equation:

$$Q_i = \frac{k_0 T_{stp} V_c}{P_{stp} T} \left(\frac{\Delta P}{\Delta t}\right) \qquad \text{EQ. (1)}$$

wherein, $Q_i$ is the average gas flow into the mass flow verifier during the period of $\Delta t$, $k_0$ a conversion constant (=$6\times10^7$ standard cubic centimeters per minute or sccm), $P_{stp}$ the standard pressure (=$1.01325\times10^5$ Pa), $T_{stp}$ the standard temperature (273.15° K), $V_c$ the measurement chamber volume, P the measured chamber gas pressure, and T the measured gas temperature.

While prior art mass flow verifiers (MFVs), such as shown and described for FIG. 1, may prove useful for their intended purposes, increasingly there has proven to be a need for mass flow verifiers that can operate with high accuracy at low volumetric flow rates used in high-precision fluid delivery systems. Prior art mass flow verifiers such as in FIG. 1 have proven to be unable to meet certain accuracy specifications at low volumetric flow rates, e.g., within 0.5% of an indicated flow reading error, at low flow rates at or below about 10 standard cubic centimeters per minute (sccm).

A need has arisen for verifying flow rates over larger flow ranges, e.g., 1 sccm to 10,000 sccm, at relatively low inlet pressures to the MFV, e.g., pressures approximately equal to or less than 75 Torr. Further, a single volume with multiple pressure sensors can not cover a wide flow range such as 1 sccm to 10,000 sccm due to the fact that the flow noise is amplified by the chamber volume.

What is desirable, therefore, are systems, methods, and apparatus that address the limitations noted by providing mass flow verifiers that can operate with high accuracy over a wide flow range at low volumetric flow rates.

SUMMARY

Embodiments of the present disclosure are directed to systems, methods, and apparatus, including software implementation, that address the deficiencies noted for previously for the prior art MFV techniques, and address current needs of verifying increased flow ranges at low inlet pressures. Aspects of the present disclosure provide high-precision measurement of mass flow rate over a large range of flows by providing an arrangement that is configured to define a plurality of preselected and different volumes so as to respectively define individual flow verification subranges, that when combined defines the entire flow verification range. The use of such an arrangement facilitates minimization of deleterious pressure-related noise in pressure measurements performed for mass flow verification. Embodiments may utilize a single manometer to facilitate reduced cost.

While certain embodiments are described herein, one of skill in the art will appreciated that other embodiments and aspects are inherent in and supported by the included description and drawings of the present disclosure.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
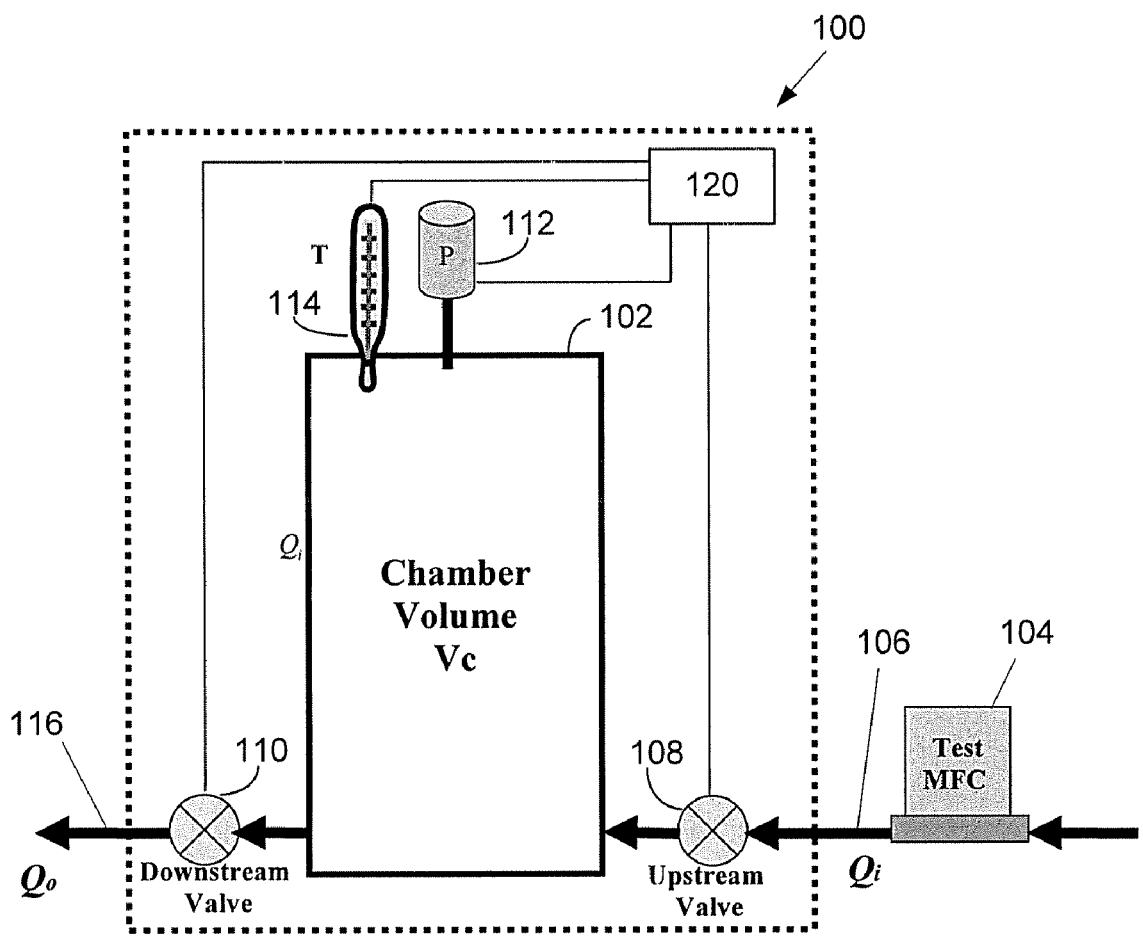
FIG. 1 is a diagrammatic view depicting a prior art mass flow verifier.
Figure 2:
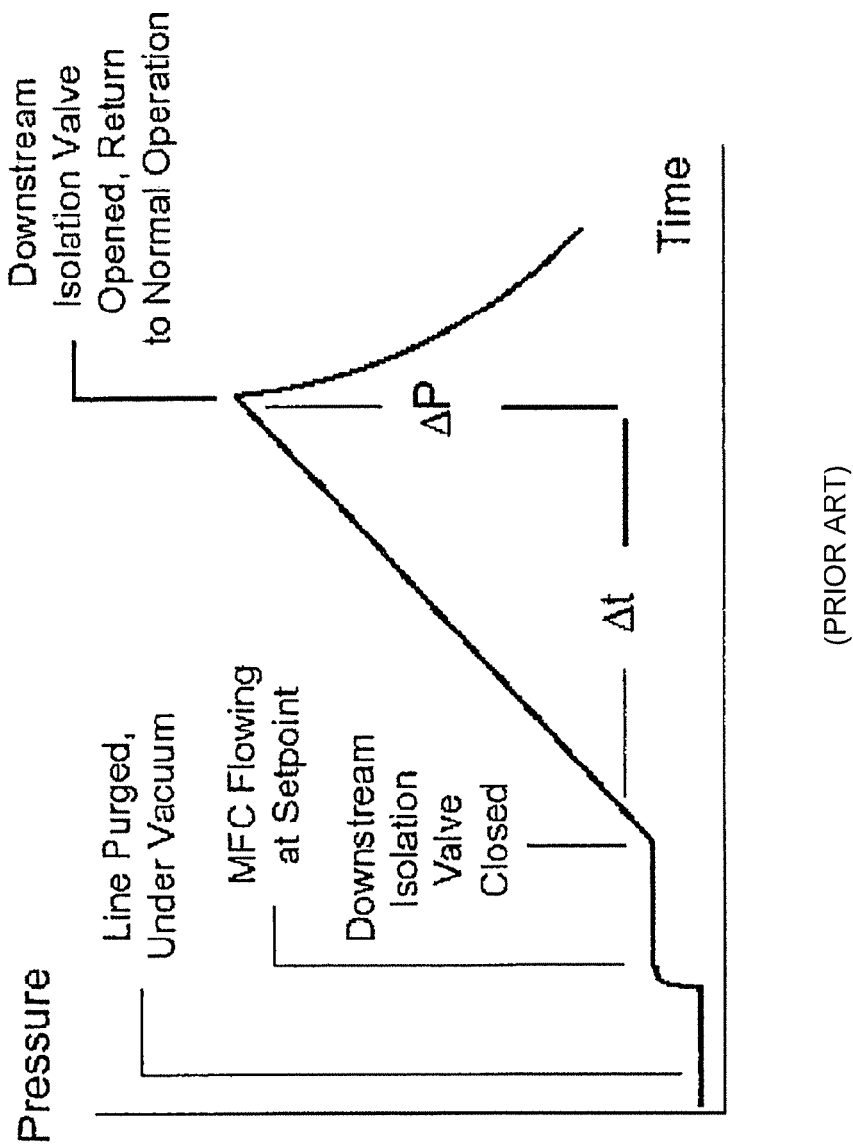
FIG. 2 is a graph depicting the pressure vs. time response of a manometer using the rate-of-rise ("ROR") measurement technique.

While certain drawings are presented herein, it should be understood by one skilled in the art that the embodiments depicted in the drawings are illustrative and variations of those shown as well as other embodiments described herein may be envisioned and practiced within the scope of the disclosure.

DETAILED DESCRIPTION

It has been recognized by the present inventors that the related noise in pressure measurements performed for mass flow verification can present a limitation for the measurement accuracy, particularly at low flow rates and low pressures.

Flow measurement noise minimization techniques according to the present disclosure can make use of the fact that for mass flow verification, the flow measurement noise, $Q_n$, which is caused by the pressure measurement noise, $\sigma_p$, is proportional to the chamber volume of the MFV, $V_c$, as follows:

$$Q_n \propto V_c \cdot \sigma_p. \qquad \text{EQ. (2)}$$

By minimizing the chamber volume of the MFV, one can minimize the flow measurement noise. However, the rate of pressure rising in the chamber volume of the MFV, $\Delta P/\Delta t$, will increase as the chamber volume decreases for a given flow rate, which can be seen according to EQ. (1). If the chamber volume is too small, the rising pressure for a high flow rate may exceed the maximum measurement range of the pressure transducer, which causes flow measurement errors. There is a tradeoff between the flow measurement range and the flow measurement accuracy (which is limited by the flow measurement noise) for a MFV.

Prior art MFVs have a single large volume with multiple pressure transducers to achieve a wide flow measurement range. For example, the Lucas Tester has a 20 liters chamber volume with three pressure transducers of full scale of 0.1, 1, and 10 Torr. The flow measurement range is 1 sccm to 2,000 sccm. However, the low flow rate measurement (<10 sccm) accuracy is limited by the pressure measurement noise which is amplified by the large chamber volume according to EQ. (2).

To minimize deleterious effects of noise in pressure measurement, including measurements at low flow rates and low pressures, embodiments of the present disclosure utilize measurement chamber volumes of different sizes that are selected based on the flow range of a particular flow device under test (DUT). The MFV provided with different volumes selects a big chamber volume to verify the high flow range while it selects a small chamber volume to verify the low flow range. Therefore, the adjustable volume MFV can balance the tradeoff between the measurement accuracy (limited by the measurement noise) and the measurement range (limited by the maximum pressure rising rate).

These aspects of the present disclosure provide for the high-precision measurement of mass flow rate over a large range of flows by utilizing multiple measurement volumes, of preselected sizes. The use of such differently-sized measurement volumes facilitates the minimization of deleterious pressure-related noise occurring in pressure measurements performed for mass flow calculation and verification. Further aspects of the present disclosure can provide use of a single manometer for such flow verification, allowing for reduced cost. Embodiments of the present disclosure are directed to systems, methods, and apparatus useful for high-accuracy measurement and/or verification of volumetric flow rates, such as from a fluid controlling device. Embodiments of the present disclosure can include software or firmware having computer-executable code, e.g., suitable algorithm(s), suitable for implementation and control of such mass flow verification utilizing multiple measurement volumes, each preferably defining a subrange of flow rates, which when combined provide a large range of flow rates.

For the flow measurement or verification of a particular DUT, multiple measurement volumes according to the present disclosure may be selected based on the operational flow range of the DUT. For example, a selected number of measurement volumes may be selected such that the volumes are different by approximately one order of magnitude ($\log_{10}$). By diverting from the DUT to a particular measurement volume that is sized in relation to the flow received from the DUT, the statistical variance of the DUT flow verification measurements can effectively be reduced or minimized. Thus, embodiments of the present disclosure can provide and/or improve accuracy of an MFV, particularly at low flow rates, e.g., on the order of 0.5 sccm and lower, by minimizing noise effects in pressure measurement for the sub ranges across the flow range of a particular mass flow DUT, as described in further detail below and in relation to the accompanying figures.

Figure 3:
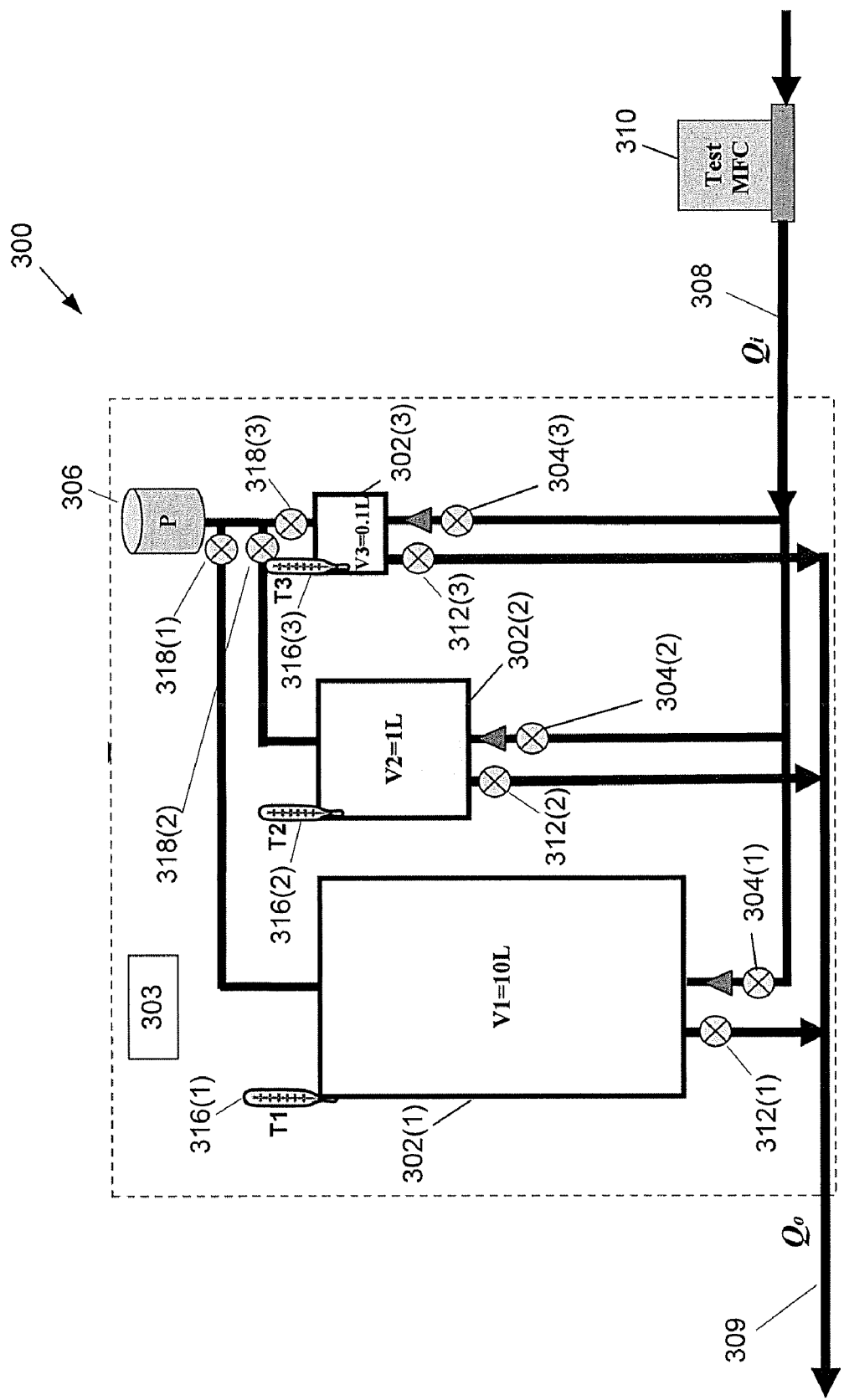
FIG. 3 is a schematic view of an embodiment of a single-manometer mass flow verifier (MFV) capable of providing different volumes according to the present disclosure.

FIG. 3 depicts a schematic view of one embodiment of an adjustable volume MFV 300 arranged according to the present disclosure. As shown, MFV 300 includes a plurality of chambers 302(1)-302(3) of different volumes (three being shown, but the number can be as few as two and as many as may be necessary to cover the entire range of interest) and can be configured and arranged so as to receive as an input, a mass flow ($Q_i$) 308 from a DUT, such as MFC 310. One or more upstream valves 304(1)-304(3) and downstream valves 312(1)-312(3) are present for selectively controlling flow into and out of each of the multiple chambers 302(1)-302(3). Manometer 306 is configured and arranged to selectively measure pressure in each of the chambers 302(1)-302(3). Flow from the chambers 302(1)-302(3) may be selectively measured by manometer 306 by selectively operating valves 318(1)-318(3), as shown. Temperature sensors 316(1)-316(3) can be configured and arranged to detect temperature associated with respective chambers 302(1)-302(3), for example, so as to detect the temperature at one or more locations, preferably at the wall of the corresponding chamber. Mass flow leaving the MFV is indicated as ($Q_o$) 309.

Controller, a processor or other similar device 303 controls the desired operation(s) of system 300 (connections from controller 303 are omitted for clarity in FIG. 3, however, any suitable connections may be present). For example, controller 303 may control or facilitate operation of one or more upstream valves, e.g., valves 304(1)-304(3), and one or more downstream valves, e.g., valves 312(1)-312(3). Controller 303 is suitably configured, for example, with software or firmware so as to control the operation of the system and carry out the sequence of desired steps. In this regard, the controller can also be suitably connected through a suitable communications link, e.g., an Ethernet connection, etc., or any suitable computer-readable medium, to receive some or all of the necessary instructions for such operation and performing the sequence of desired steps.

Each measurement chamber, e.g., any one of chambers 302(1)-302(3), of system 300 can be configured and arranged to have a desired volume and receive a fluid flow (e.g., of a desired semiconductor process gas) from an inlet 308 connected to receive a fluid from a device under test (DUT), such as a mass flow controller, MFC 310. The inlet is connected to corresponding inlet or upstream valves 304(1)-304(3), the valves being operated so as to select which chamber is to receive the fluid from the inlet 308. The inlet valves 304(1)-304(3) are connected to the corresponding chambers 302(1)-302(3). The exemplary embodiment shown comprises three chambers with respective and different volumes that are logarithmically scaled, e.g., 10 liters, 1 liter, and 0.1 liter, respectively. The flow verification range of these three chambers are also logarithmically scaled, e.g., 1,000-10,000 sccm, 100-1,000 sccm, and 1-100 sccm, respectively. Of course, while three measurement chambers are shown in FIG. 3, any suitable number of chambers may be used, and the differences in sizes may also vary. Accordingly, embodiments of the present disclosure can operate to measure any range of flow rates, and is particularly useful at low mass flow rates (<10 sccm) with an accuracy (within 0.5% of reading errors). Each chamber includes an outlet connected to a corresponding outlet or downstream valve 312(1)-312(3). Each downstream valve selectively connects the corresponding chamber to the outlet 309 of the system 300. Each chamber is also preferably connected through a test valve 318(1)-318(3) to a pressure sensor 306 so that by selectively operating each valve 318(1)-318(3), the pressure within a particular chamber can be measured over the desired period of time. Each chamber 302(1)-302(3) also includes a temperature sensor 316(1)-316(3) for measuring the pressure in each chamber 302(1)-302(3). Measurements of the temperature of the fluid within each chamber taken by the corresponding temperature sensor 316(1)-316(3) are provided to the controller 303, and similarly, pressure measurements from the pressure sensor 306 are provided to the controller. Control of the upstream and downstream valves 304(1)-304(3) and 312(1)-312(3) are selectively controlled by the controller as well.

The subranges provided by the chambers preferably either overlap or are contiguous, in seriatim, so as to provide one continuous full range for the system of MFV 300. By using multiple chambers, the range of MFV can be expanded as a function of the number of chambers and corresponding parts.

Referring again to FIG. 3, if both the upstream valve 304(1)-304(3), and the corresponding downstream valve, 312(1)-312(3) associated with a selected chamber 302(1)-302(3) of the MFV 300 are open, the flow through the selected chamber will be at, or will eventually achieve a steady state flow. The corresponding downstream valve 312(1)-312(3) is then shut for flow verification, and the chamber pressure rises in the selected chamber. In this way, a chamber 301 of a select volume can be chosen, and a rate of rise measurement can be made using the common manometer and 306 and the corresponding temperature sensor 316.

Figure 4:
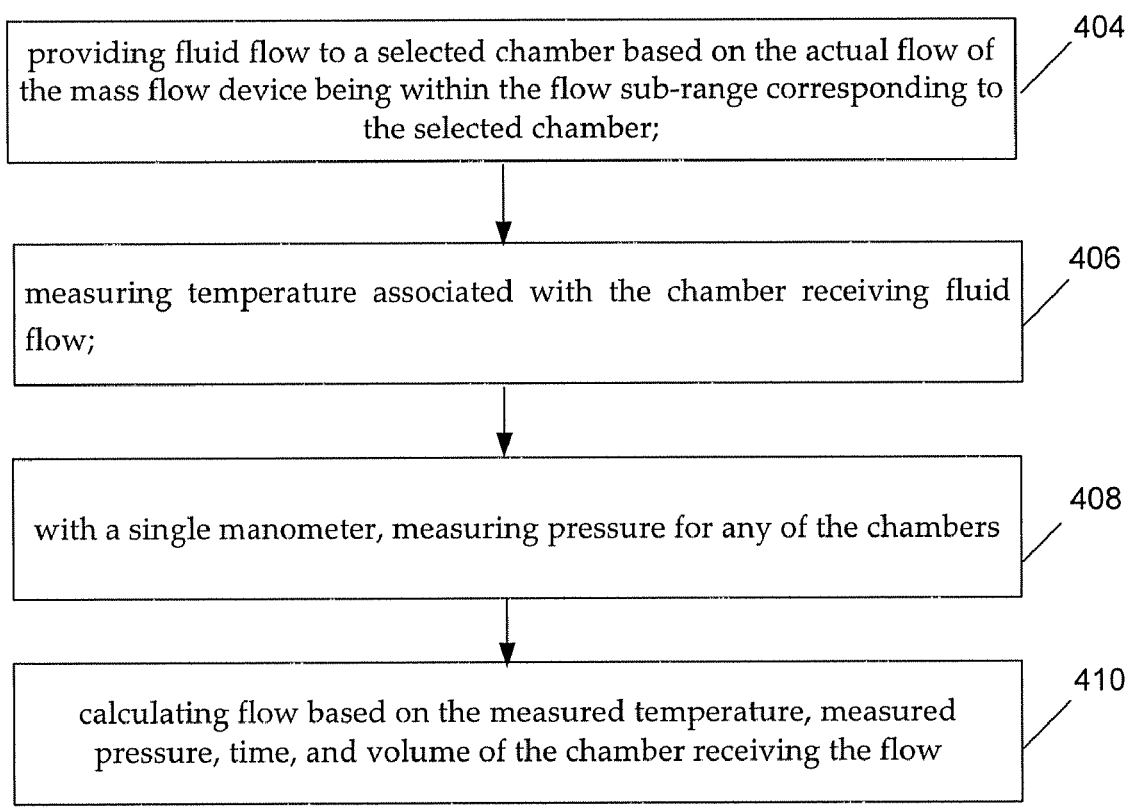
FIG. 4 is a diagram depicting a method of measuring flow and providing flow verification in accordance with an embodiment of the present disclosure.

FIG. 4 depicts an embodiment of a method 400 of measuring flow according to the present disclosure, e.g., as could be employed with the MFV 300 of FIG. 3. A plurality of chambers or vessels of known or selected volume, e.g., volumes 312(1)-312(3), may be provided, as described at step 402, such that the volume of each chamber corresponds to a flow sub-range of the operational range of a mass flow verifier or a device under test (DUT) such as a mass flow controller.

Fluid flow may be provided to a selected chamber based on the actual flow of the mass flow device being within the flow sub-range corresponding to the selected chamber, as described at step 404. Prior to step 404, the particular flow range is determined, either automatically, or by the user, so as to determine the particular chamber 302(1)-302(3) that needs to be used for the measurement. The controller 303 then is preferably used to close all the upstream, downstream, and test valves associated with the other non-selected chambers, and to only operate the upstream, downstream and test valves associated with the selected chamber, which will start the measurement within the appropriate flow subrange at step 404. The temperature associated with the selected chamber receiving the fluid flow may be measured using, for example, the corresponding temperature sensor 316, as described at step 406. The appropriate test valve 318 of the selected chamber is open allowing the pressure within the selected chamber to be measured with a single manometer when the downstream valve 312 is closed, as described at 408. Flow can be calculated based on the measured temperature, pressure, time, and volume of the chamber receiving the flow, as described at step 410.

While certain embodiments have been described herein, it will be understood by one skilled in the art that the methods, systems, and apparatus of the present disclosure may be embodied in other specific forms without departing from the spirit thereof.

Figure 5:
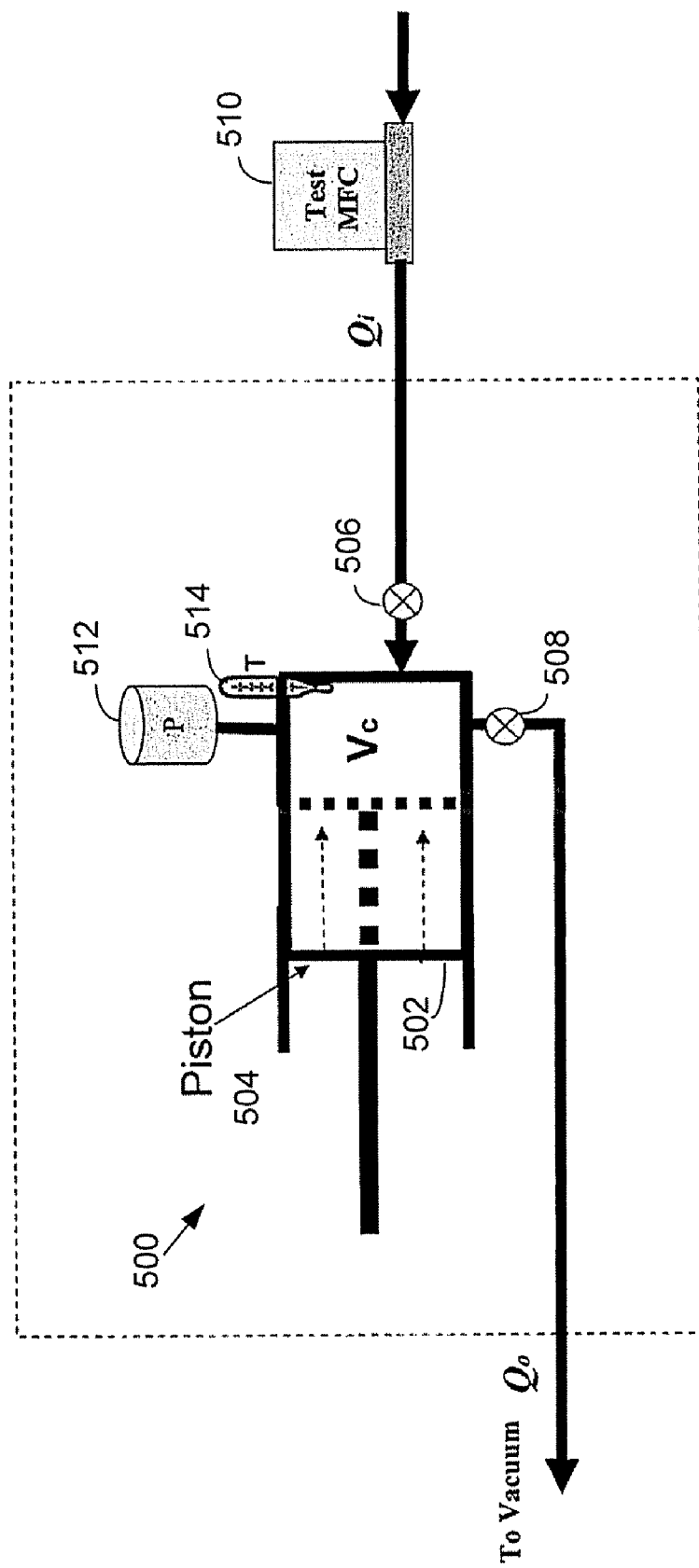
FIG. 5 is a schematic view of another embodiment of a single-manometer mass flow verifier capable of providing different volumes.

For example, while systems and methods herein have generally been described as including at least two different chambers, and in the illustrated embodiment as including three different chambers, any suitable number of chambers may be used for the multiple chambers in accordance with the present disclosure. In the embodiments described each chamber is provided with a fixed volume. It should be understood that as few as one chamber can be used where the volume of the chamber can be adjusted to any of two or more of the preselected volumes that correspond to the subranges of the operational range of the system. For example, as shown in FIG. 5, the chamber 500 could have an end wall 502 with suitable seal(s) that is adjustable to enlarge or reduce the volume to the preselected level. End wall 502 can for example be a part of a movable piston 504. An inlet valve 506 and outlet valve 508 are provided for controlling flow from the DUT 510 into the chamber, and out the chamber. Manometer 512 and temperature sensor 514 are provided for making the appropriate pressure and temperature measurements during the rate of rise of pressure in the chamber. Thus, all three volumes provided in the FIG. 3 embodiment could then be provided with a single chamber having an adjustable volume. In fact the arrangement shown allows for any number of volumes to be provided, with the maximum volume being provided when the piston is fully retracted, and the minimum volume being provided when the piston is in a position adjacent to the manometer inlet and thermal sensor Further, one or more chambers can be provided with fixed volume, while others with adjustable volumes. Additionally, while the embodiments described herein have referred to use of a single manometer, multiple manometers may be used in conjunction with multiple measurement volumes according the present disclosure. For example, one or more secondary or back-up manometers may be configured in parallel or series with a primary manometer.

Accordingly, the embodiments described herein are therefore to be considered in all respects as illustrative and not restrictive of the present disclosure.

What is claimed is:

1. A mass flow verifier for verifying flow of a fluid from a mass flow device operating over an operational flow range, the mass flow verifier comprising:
   a system constructed and arranged so as to define different predetermined volumes so as to represent subranges within the operational flow range, each volume comprising an inlet for receiving flow from the mass flow device, and an outlet valve so that pressure changes occurring from flow from the mass flow device into a volume can be measured when the outlet valve is closed;
   a temperature sensor constructed and arranged so as to generate a signal representative of the temperature of the fluid within a volume when the pressure changes are being measured within the volume;
   a pressure sensor constructed and arranged so as to generate signals representative of the pressure changes in a volume when the pressure changes are being measured within the volume; and
   a controller configured and arranged so as to measure flow from the mass flow controller into any select one of the volumes as a function of the manometer pressure signal, the temperature signal, and the size of the select volume.

2. The mass flow verifier of claim 1, wherein the system includes a plurality of chambers for defining the different volumes.

3. The mass flow verifier of claim 1, wherein the system includes a chamber having a volume that is adjustable so as to define the different predetermined volumes.

4. The mass flow verifier of claim 3, wherein the chamber includes a wall that is movable so as to provide the adjustable volume.

5. The mass flow verifier of claim 4, wherein the wall is a part of a movable piston.

6. The mass flow verifier of claim 1, wherein the plurality of volumes are defined by three separate chambers.

7. The mass flow verifier of claim 6, wherein the three chambers include a first chamber having a volume of about 10.0 liters, a second chamber having a volume of about 1.0 liter, and a third chamber having a volume of about 0.1 liter.

8. The mass flow verifier of claim 7, wherein the first chamber with a volume of about 10.0 liters is configured and arranged to operate so as to measure within a flow rate range of about 10,000 to about 1,000 sccm.

9. The mass flow verifier of claim 7, wherein the second chamber with a volume of about 1.0 liter is configured and arranged to operate so as to measure within a flow rate range of about 1,000 to about 100 sccm.

10. The mass flow verifier of claim 7, wherein the third chamber with a volume of about 0.1 liter is configured and arranged to operate so as to measure a flow rate range of about 100 to about 1 sccm.

11. The mass flow verifier of claim 7, wherein the plurality of chambers is configured and arranged to operate so as to measure pressure for a flow rate range of about 10,000 to about 1 sccm.

12. The mass flow verifier of claim 1, wherein the pressure sensor is a capacitive manometer.

13. The mass flow verifier of claim 12, wherein the verifier includes a single pressure sensor for use with each volume.

14. The mass flow verifier of claim 13, wherein the verifier includes valves between an outlet of each volume and the single pressure sensor so as to control the flow from a selected volume to the single pressure sensor.

15. A method of verifying flow of a fluid from a mass flow device operating over an operational flow range, the method comprising:
   defining different predetermined volumes so as to represent subranges within the operational flow range;
   selectively controlling flow from the mass flow device through an inlet of each volume, and selectively controlling flow from each volume through an outlet valve so that pressure changes occurring from flow from the mass flow device into a volume can be measured when the outlet valve is closed;
   generating with a temperature sensor a signal representative of the temperature of the fluid within a volume when the pressure changes are being measured within the volume;
   generating with a pressure sensor a signal representative of the pressure changes in a volume when the pressure changes are being measured within the volume; and
   measuring flow from the mass flow controller as a function of the manometer pressure signal, the temperature signal, and the known volume of one of the plurality of volumes.

16. The method of claim 15, further comprising selecting a volume to receive fluid flow from the mass flow device based on the flow being within the flow sub-range corresponding to the volume.

17. The method of claim 15, wherein the flow range of the mass flow device is about 10,000 sccm to about 1 sccm.

18. The method of claim 15, wherein defining different predetermined volumes so as to represent subranges within the operational flow range includes adjusting the volume of a chamber to a select one of the predetermined volumes.

* * * * *